March 5, 1963

G. W. HARTZELL 3,079,962

SAWMILL DOG STRUCTURE

Filed Oct. 20, 1960

INVENTOR.
GEORGE WILLIAM HARTZELL
BY
ATTORNEYS

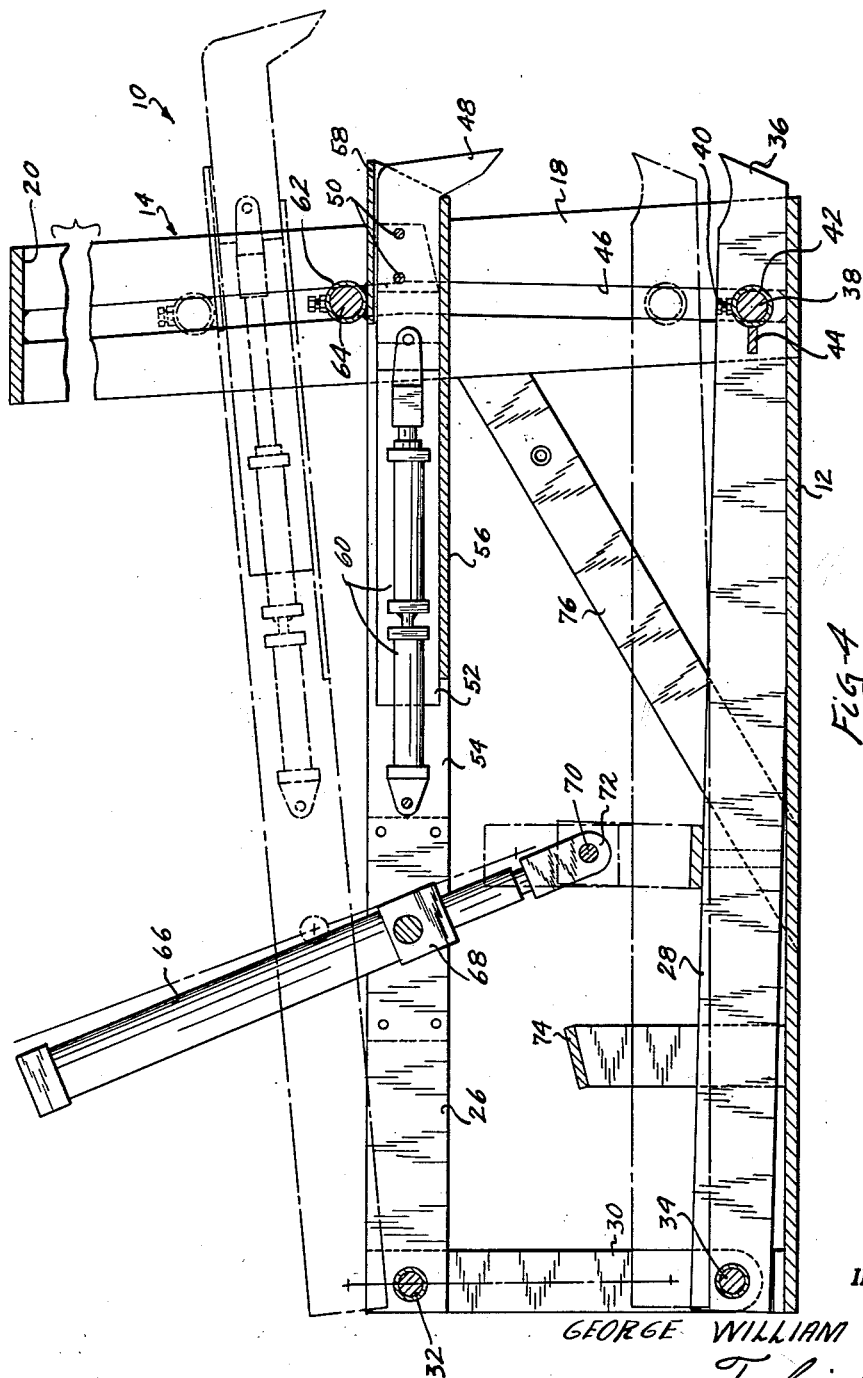

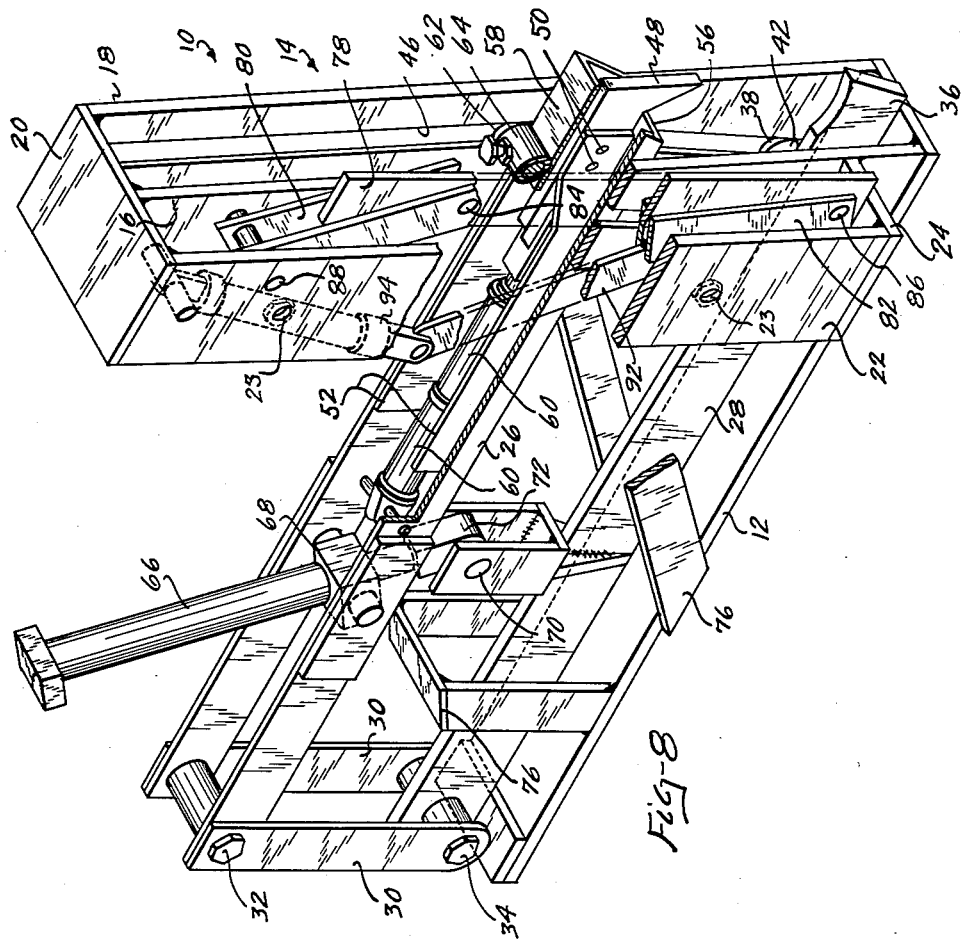

3,079,962
Patented Mar. 5, 1963

3,079,962
SAWMILL DOG STRUCTURE
George William Hartzell, Piqua, Ohio, assignor to Hartzell Industries, Inc., Piqua, Ohio, a corporation of Ohio
Filed Oct. 20, 1960, Ser. No. 63,891
6 Claims. (Cl. 143—125)

This invention relates to sawmill equipment, and is particularly concerned with a new and improved sawmill dog structure and actuating mechanism therefor.

In connection with sawmills, one of the regions in which improvements can be made is in connection with the jaw structure and the actuating mechanism therefor. There are a great many sawmill mechanisms for sawing logs in existence which are adequate with respect to the carriage and knee frame structure and the mechanism for reciprocating the carriage but which are lacking in efficiency on account of antiquated jaw mechanisms.

The jaw mechanism, as is known, operates to grip the log being sawed and to hold it against the knee of the carriage as the carriage reciprocates relative to the saw. It is in particular connection with improvements of the jaw structure and the actuating mechanism therefor that the present invention is concerned.

It is, thus, a primary object of the present invention to provide an improved jaw mechanism for sawing logs.

Another object of this invention is the provision of an improved jaw structure for sawmills which will have improved operating characteristics but which will be relatively inexpensive to manufacture.

A still further object of this invention is the provision of an improved jaw structure for sawmill mechanisms which is arranged so that it can readily be attached to the knee of existing sawmills without any modification of the sawmill structure.

A still further object of this invention is the provision of a novel sawmill dog structure having improved characteristics with regard to gripping the log tightly and with regard to moving the log to carry out taper sawing operations.

Still a further object of this invention is the provision of a sawmill jaw structure which can be substantially completely fabricated from conventional bar stock by simple cutting and welding operations and with the provision of a few simple hydraulic motors for the actuation thereof.

These and other objects and advantages of the present invention will become more apparent upon reference to the following specification in which:

FIGURE 4 is a vertical sectional view indicated by line 4—4 on FIGURE 2;

FIGURE 5 is a vertical sectional view indicated by line 5—5 on FIGURE 1;

FIGURE 6 (Sheet 1) is a diagrammatic representation of the hydraulic control circuit for controlling the actuation of the fluid motors forming the actuating means for the mechanism;

FIGURE 7 is a diagrammatic representation of the electric circuit which controls the hydraulic circuit of FIGURE 6; and FIGURE 8 (Sheet 4) is a perspective view of the jaw structure.

Figure 1:
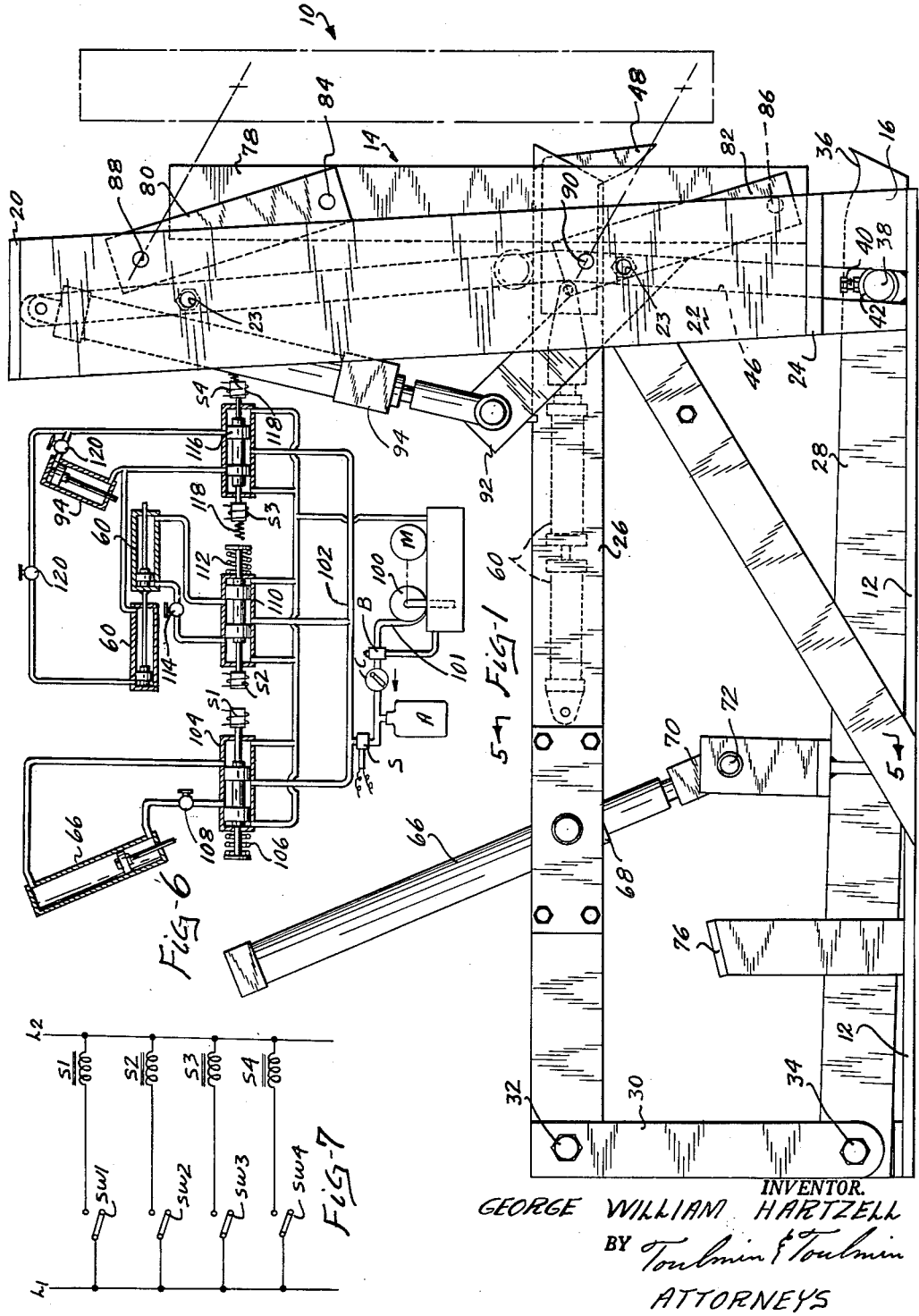
FIGURE 1 is a side elevational view of a sawmill jaw structure according to my invention.

Referring to the drawings somewhat more in detail and with particular respect to FIGURES 1 through 5, the improved jaw structure of the present invention comprises a frame generally indicated at 10. This frame comprises a base portion 12 that rests on the sawmill carriage and at one side, namely, the log side has an upstanding portion 14, inclined to the rear.

Figure 3:
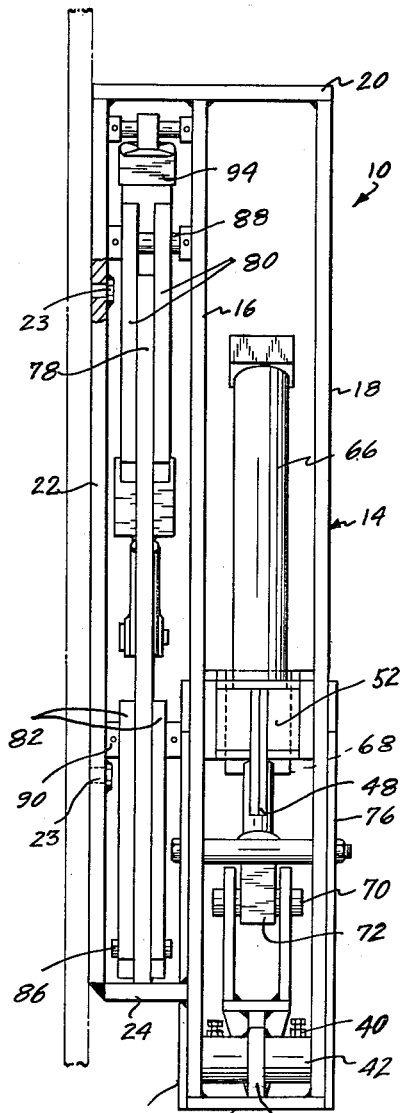
FIGURE 3 is an end view looking in from the right side of FIGURE 1.

As will be seen in FIGURE 3, the upstanding portion 14 consiststs of spaced side members 16 and 18 welded at their lower ends to the base member 12 and interconnected at their upper ends by a top plate 20. Top plate 20 extends beyond the upright side member 16 and has dependent therefrom another side member 22 that terminates upwardly from the base member 12. A lower plate 24 is welded between the lower end of member 22 and side member 16 previously referred to.

Disposed between side members 16 and 18 of the upstanding portion 14 of the frame are a pair of jaw arms, the upper being indicated at 26 and the lower one being indicated at 28. At their one ends, remote from the log ends thereof, the arms are interconnected by link means 30 pivoted at 32 to upper arm 26 and at 34 to lower arm 28. At the log end of arm 28 there is a log engaging dog or jaw portion 36 which extends outwardly beyond upstanding portion 14 of the frame. This dog portion is in the form of a member attached to arm 28 or it may be formed integrally with arm 28. Also carried by arm 28 between the front and back edges of said members 16 and 18 is a pin member 38. This pin member is clamped by set screws 40 in a sleeve or bushing 42 that is rigidly attached to arm 28 as by welding.

There are preferably provided the bracing gusset plates 44 extending between the back side of sleeve 42 and the arm 28. The pin 38 is provided for the purpose of guiding the jaw end of arm 28 as it moves vertically in upstanding portion of frame 14.

To this end, both of plates or side members 16 and 18 are in the form of spaced elements which therebetween define the pin receiving slots 46 into which the ends of pin 38 extend. The slots 46 are easily arrived at by splitting the plates or side members 16 and 18 by cutting and then attaching the plates to the base member 12 and top member 20 with the separate portions thereof in spaced relation. The slots so formed are vertical along the bottom portion and incline to the rear along the top portion.

The upper arm 26 also carries a dog or jaw element 48 at its log end and which jaw element also projects outwardly from the upstanding frame part 14.

Figure 2:
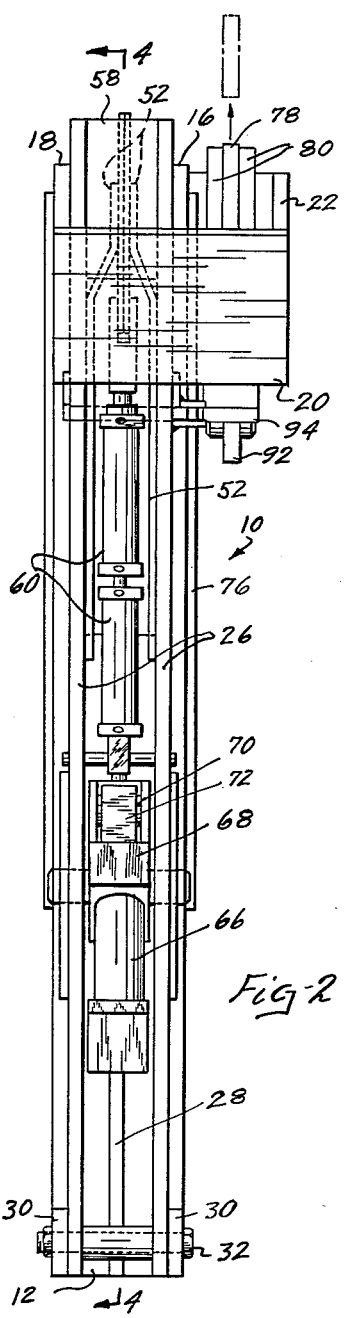
FIGURE 2 is a plan view looking down on top of the jaw structure.

Jaw element 48, however, is reciprocal on its pertaining arm and is arranged for this purpose as will best be seen in FIGURES 2 and 4. The jaw element 48 is attached as by rivets 50 to a pair of wings or longitudinally extending guide plates 52 that are disposed relatively closely between parallel side members 54 making up the aforementioned upper arm 26. A lower closure plate 56 extends between the side members 54 from the jaw end of arm 26 a substantial distance therealong and a somewhat shorter plate 58 is provided between the tops of the side members 54 at the jaw end.

This makes a box-like structure in which the jaw element 48 and the guide wings 52 attached thereto can reciprocate while simultaneously being guided.

Connected between the back end of jaw element 48 and a point spaced therefrom on upper arm 26 are the tandem connected hydraulic motors 60 which are selectively energizable for moving the jaw element inwardly and outwardly on supporting arm 26.

The supporting arm 26 has a sleeve member 62 attached to the top thereof through which extends a pin or rod 64 engaging the slots 46 previously referred to. This arrangement provides for guiding of the jaw end of the upper arm 26 in the same manner as the corresponding end of the lower arm 28 is guided.

For moving the arms toward and away from each other, there is provided a hydraulic motor 66, the cylinder of which is supported on upper arm 26 by trunnion means 68, and the ram of which is connected by pivot pin 70 with a yoke 72 that is fixedly attached, as by welding, to lower arm 28.

It will be noted that motor 66 is inclined relative to the arms 26 and 28 so that actuation of the motor to move the arms toward each other will urge the upper arm 26 toward the front side of guide slots 46. The purpose of this is to take up any lost motion between pin 64 and the front edge of the guide slots so that after a log is gripped in the jaw structure it will be held tight against the knee of the sawmill carriage.

A stop is provided by limiting vertical movement of the end of lower arm 28 that is remote from the jaw end thereof in the form of stop bracket 74 attached to base plate 12 and upstanding therefrom and extending over the top of arm 28.

An inclined brace means 76 is also preferably provided extending from base member 12 upwardly at an angle to the back of upstanding frame part 14.

The arrangement of the present invention also comprises a tapering knee, said knee taking the form of a plate 78 which is disposed between the vertical members 16 and 22 of the upstanding frame portion 14.

Plate 78 is supported on links 80 and 82 which are pivoted at their one ends to plate 78 and 84 and 86 and at their other ends between the vertical members 16 and 22 by pivot pins 88 and 90. By this arrangement, plate 78 can move in substantial parallelism with itself toward and away from the frame of the jaw structure.

For moving the plate 78, the lower link 82 has fixed thereto an actuating arm 92 extending upwardly at an angle therefrom. Connected therebetween the outer end of actuating arm 92 and the upper ends of side members 16 and 22 of upstanding frame portion 14 is a hydraulic motor 94. The reversible energization of motor 94 will thus cause movement of plate 78 in the manner described.

FIGURE 6 shows the hydraulic circuit for controlling the movements of the arms of the jaw mechanism and the taper knee 78 and the upper dog 48.

In FIGURE 6, there is a pump 100 that delivers fluid under pressure to a conduit 101 that leads through a bypass or relief valve B and a check valve C to an accumulator A. The conduit leading to an accumulator A is also connected to the inlet side of a safety valve S. The arrangement provides for charging of the accumulator to a predetermined pressure whereupon bypass valve B will open and bypass the pump to the reservoir, check valve C at this time holding the pressure in the system.

Safety valve S is provided for operating an electric switch so that any failure of the bypass valve B will result in deenergization of the drive motor for the pump thereby to prevent the development of excessive pressures in the system.

Conduit means 102 leads from the outlet side of safety valve S to the inlets of a plurality of reversing valves that are connected to the several motors.

A valve 104 is connected to the motor 66. Valve 104 is urged by a spring 106 into position to cause the ram to retract into the cylinder of the motor thereby to urge the arms toward each other into log gripping relation.

Energization of a solenoid S1 pertaining to the valve will shift it into its other position wherein the ram is driven outwardly of the cylinder of the motor thereby to separate the arms. A flow control valve 108 may be placed in series with the motor to control the rate of movement thereof.

A second reversing valve 110 is connected to one of the hydraulic motors 60 and is normally urged by a spring 112 into position to cause retraction of the ram of the motor into the cylinder thereof.

Energization of a solenoid S2 pertaining to the valve will shift the valve into position to cause the ram to advance outwardly of the cylinder. A flow control valve 114 may also be included in the circuit of this motor, if so desired.

A third reversing valve 116 is connected to the hydraulic motor 94 pertaining to the taper knee and in parallel with this hydraulic motor is the other one of the hydraulic motors 60 pertaining to dog 48.

Valve 116 is normally centered by the spring means 118 so as to prevent fluid flow to or from the motors connected thereto. Energization of a solenoid S3 pertaining to the valve will shift it into position to direct hydraulic fluid to motor 94 to retract the taper knee and to the said other one of the motors 60 to cause retraction of the ram thereof into the cylinder.

Energization of a solenoid S4, on the other hand, will shift valve 116 so as to direct fluid to motor 94 to move the taper knee outwardly while simultaneously fluid is supplied to the said other of the motors 60 to cause the ram thereof to move outwardly thus to move dog 48 outwardly.

Flow control valves 120 may be provided in circuits with the hydraulic motors under the control of valve 116 and by properly adjusting these flow control valves, the dog 48 can be caused to move outwardly in timed relation to the outward movement of the taper knee whereby the log engaged by the dog 48 is always held firmly against the taper knee while, at the same time, the outward movement of the dog 48 will assist in moving the log.

An electrical circuit for controlling the several solenoids referred to is illustrated in FIGURE 7 wherein it will be seen that the several solenoids are connected between the power lines L1 and L2 in series with the normally open manual switches SW1, SW2, SW3, and SW4. It will be noted that the solenoids are all normally deenergized so that the several valves which they operate normally occupy the positions in which they are illustrated in FIGURE 6.

The valves in these positions are so located that in the event of a power failure or failure of the electrical control system, the log supported on the carriage by the jaw structure will be firmly retained thereon and will not become loose on account of the jaw structure falling slack and which, of course, would be hazardous on account of the possibility of the log being pushed into the rotary saw blade that forms a part of the sawmill rig.

While only a single dogging arrangement according to the present invention has been illustrated, it will be understood that there would be two or more of the dogging arrangements for each sawmill carriage and that they could be arranged with all the corresponding hydraulic motors and control solenoids connected in parallel for simultaneous actuation by a single set of manual switches.

There has been illustrated an arrangement wherein the dog on the upper arm is movable by hydraulic motor means carried on the arm while the lower dog is fixed to the lower arm. It is probably, however, that dogging arrangements will be constructed wherein both the upper and lower dogs are arranged for movement inwardly and outwardly on their pertaining arms to assist in the dogging of large logs and the like.

It will accordingly be understood that it is desired to comprehend within this invention the provision of a lower arm constructed the same as the upper arm so that the lower dog could also be reciprocated on its lower arm.

It will be understood that this invention is susceptible to modification in order to adapt it to different usages and conditions; and, accordingly, it is desired to comprehend such modifications within this invention as may fall within the scope of the appended claims.

I claim:

1. In a dogging arrangement for a sawmill; a frame, upper and lower jaw arms in the frame, a link extending between the arms at one end and pivoted to both thereof, jaw elements on the other ends of said arms projecting beyond said frame, said frame comprising cam slot means adjacent the jaw ends of said arms, means on the arms engaging said cam slot means to guide the arms when moved in the frame, hydraulic motor means having one part attached to the upper arm and another part attached to the lower arm so a reversible supply of fluid to the said hydraulic motor means will open and close said arms, the jaw element on at least one of said arms being reciprocable thereon, hydraulic motor means connected between the said one of said arms and its said jaw element for moving the jaw element, individual control valves associated with said hydraulic motor means, a source of hydraulic fluid under pressure, including an accumulator and connected to the inlets of said valves, an electric operator for said valves, and means biasing said valves toward positions to cause said arms to close and cause retraction of said moveable jaw element whereby in the event of a power failure a log will remain gripped in place.

2. In a dogging arrangement for a sawmill; a frame, upper and lower jaw arms in the frame, a link extending between the arms at one end and pivoted to both thereof, jaw elements on the other ends of said arms projecting beyond said frame, said frame comprising cam slot means adjacent the jaw ends of said arms, means on the arms engaging said cam slot means to guide the arms when moved in the frame, a hydraulic cylinder attached to the upper arm, and a ram reciprocable in the cylinder attached to the lower arm so a reversible supply of fluid to the cylinder will open and close said arms, the jaw element on the upper arm being reciprocable thereon, a pair of hydraulic motors arranged in tandem and connected between the upper arm and its said jaw element for moving the jaw element, an individual control valve connected with each of said motors and with said cylinder, a source of fluid under pressure including an accumulator connected to the inlets of said valves, and said valves being normally positioned to cause said arms to close and said upper jaw element to retract whereby in the event of a power failure a log will remain gripped in place.

3. In a dogging arrangement for a sawmill; a frame adapted for detachable connection to the knee of a sawmill carriage, upper and lower substantially horizontal arms in the frame, a link pivotally connecting the ends of said arms opposite their log ends, jaw elements on the log ends of the arms projecting beyond said frame, said frame comprising an upstanding portion at the jaw ends of said arms, cam slots in said upstanding portion, pins on the arms engaging said cam slots to guide the arms in their vertical movements, a first hydraulic motor connected between the arms between the ends thereof for opening and closing the arms, means reciprocably supporting the jaw element for the upper arm thereon, second and third tandem arranged hydraulic motors connected between said upper arm and its said jaw element, a source of fluid under pressure, a first valve between said source and said first motor biased toward position to cause closing of said arms and selectively movable to cause opening of said arms, a second valve between said source and said second motor biased toward position to cause retraction of the jaw element on the upper arm and selectively moveable to cause outward movement of said jaw element, and a third valve between said source and said third motor normally biased toward position to entrap fluid in said third motor and selectively movable to cause movement of the jaw element on the upper arm in either direction.

4. In a dogging arrangement for a sawmill; a frame adapted for detachable connection to the knee of a sawmill carriage, upper and lower substantially horizontal arms in the frame, a link pivotally connecting the ends of said arms opposite their log ends, jaw elements on the log ends of the arms projecting beyond said frame, said frame comprising an upstanding portion at the jaw ends of said arms, cam slots in said upstanding portion, pins on the arms engaging said cam slots to guide the arms in their vertical movements, a first hydraulic motor connected between the arms between the ends thereof for opening and closing the arms, means reciprocably supporting the jaw element for the upper arm thereon, second and third tandem arranged hydraulic motors connected between said upper arm and its said jaw element, a source of fluid under pressure, a first valve between said source and said first motor biased toward position to cause closing of said arms and selectively movable to cause opening of said arms, a second valve between said source and said second motor biased toward position to cause retraction of the jaw element on the upper arm and selectively moveable to cause outward movement of said jaw element, and a third valve between said source and said third motor normally biased toward position to entrap fluid in said third motor and selectively movable to cause movement of the jaw element on the upper arm in either direction, said first motor being connected between said arms at such an angle to said cam slots as to thrust said upper arm toward the log side of the cam slots when actuating said arms in their closing direction.

5. In a dogging arrangement for a sawmill; a frame adapted for detachable connection to the knee of a sawmill carriage, upper and lower substantially horizontal arms in the frame, a link pivotally connecting the ends of said arms opposite their log ends, jaw elements on the log ends of the arms projecting beyond said frame, said frame comprising an upstanding portion at the jaw ends of said arms, cam slots in said upstanding portion, pins on the arms engaging said cam slots to guide the arms in their vertical movements, a first hydraulic motor connected between the arms between the ends thereof for opening and closing the arms, means reciprocably supporting the jaw element for the upper arm thereon, second and third tandem arranged hydraulic motors connected between said upper arm and its said jaw element, a source of fluid under pressure, a first valve between said source and said first motor biased toward position to cause closing of said arms and selectively movable to cause opening of said arms, a second valve between said source and said second motor biased toward position to cause retraction of the jaw element on the upper arm and selectively moveable to cause outward movement of said jaw element, and a third valve between said source and said third motor normally biased toward position to entrap fluid in said third motor and selectively movable to cause movement of the jaw element on the upper arm in either direction, a bar member forming a taper knee mounted in the upstanding portion of said frame for movement inwardly and outwardly on the log side of the frame in substantial parallelism with itself, a fourth hydraulic motor connected between the frame and said bar member, and said fourth hydraulic motor being hydraulically connected in parallel with said third hydraulic motor for simultaneous inward and outward movement in the same direction of the jaw element on the upper arm and said bar member.

6. In a dogging arrangement for a sawmill; a frame adapted for detachable connection to the knee of a sawmill carriage, upper and lower substantially horizontal arms in the frame, a link pivotally connecting the ends of said arms opposite their log ends, jaw elements on the log ends of the arms projecting beyond said frame, said frame comprising an upstanding portion at the jaw ends of said arms, cam slots in said upstanding portion, pins on the arms engaging said cam slots to guide the arms in their vertical movements, a first hydraulic motor connected between the arms between the ends thereof for opening and closing the arms, means reciprocably supporting the jaw element for the upper arm thereon, second and third tandem arranged hydraulic motors connected between said upper arm and its said jaw element, a source of fluid under pressure, a first valve between said source and said first motor biased toward position to cause closing of said arms and selectively movable to cause opening of said arms, a second valve between said source and said second motor biased toward position to cause retraction of the jaw element on the upper arm and selectively moveable to cause outward movement of said jaw element, and a third valve between said source and said third motor normally biased toward position to entrap fluid in said third motor and selectively movable to cause movement of the jaw element on the upper arm in either direction, a bar member forming a taper knee mounted in the upstanding portion of said frame for movement inwardly and outwardly on the log side of the frame in substantial parallelism with itself, a fourth hydraulic motor connected between the frame and said bar member, and said fourth hydraulic motor being hydraulically connected in parallel with said third hydraulic motor for simultaneous inward and outward movement in the same direction of the jaw element on the upper arm and said bar member, there being flow control valve means in the circuit for said third and fourth motors operable to control the relative rate of movement of the motors.

References Cited in the file of this patent

UNITED STATES PATENTS

| | | |
|---|---|---|
| 1,781,220 | Ferris | Nov. 11, 1930 |
| 1,840,846 | Martin | Jan. 12, 1932 |
| 2,626,640 | Cahoon | Jan. 27, 1953 |
| 2,633,879 | Andrus | Apr. 7, 1953 |
| 2,661,779 | Saunders | Dec. 8, 1953 |

FOREIGN PATENTS

| | | |
|---|---|---|
| 530,372 | Canada | Sept. 18, 1956 |